US007118274B2

(12) United States Patent
Van Phan et al.

(10) Patent No.: US 7,118,274 B2

(45) Date of Patent: Oct. 10, 2006

(54) METHOD AND REFERENCE CIRCUIT FOR BIAS CURRENT SWITCHING FOR IMPLEMENTING AN INTEGRATED TEMPERATURE SENSOR

(75) Inventors: Nghia Van Phan, Rochester, MN (US); Patrick Lee Rosno, Rochester, MN (US); James David Strom, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 10/849,580

(22) Filed: May 20, 2004

(65) Prior Publication Data

US 2005/0259718 A1 Nov. 24, 2005

(51) Int. Cl.

*G01K 7/01* (2006.01)
*G01K 7/14* (2006.01)
*G05F 3/24* (2006.01)
*G05F 3/26* (2006.01)

(52) U.S. Cl. ...................... 374/178; 323/315; 327/513; 327/538; 374/170

(58) Field of Classification Search .................... 374/1, 374/163, 183, 178; 327/512, 513, 102, 103, 327/541, 543, 538, 540; 323/315

See application file for complete search history.

(56) References Cited

U.S. PATENT DOCUMENTS

| | | | | |
|---|---|---|---|---|
| 3,617,778 | A * | 11/1971 | Korom | 327/540 |
| 4,017,748 | A * | 4/1977 | Davis | 327/540 |
| 4,165,642 | A * | 8/1979 | Lipp | 374/170 |
| 4,645,948 | A * | 2/1987 | Morris et al. | 327/538 |
| 4,922,131 | A * | 5/1990 | Anderson et al. | 327/66 |
| 5,094,546 | A * | 3/1992 | Tsuji | 374/178 |
| 5,422,832 | A * | 6/1995 | Moyal | 702/132 |
| 5,453,682 | A * | 9/1995 | Hinrichs et al. | 324/132 |
| 5,639,163 | A * | 6/1997 | Davidson et al. | 374/178 |
| 5,903,141 | A * | 5/1999 | Tailliet | 323/312 |
| 6,008,685 | A * | 12/1999 | Kunst | 327/512 |
| 6,019,508 | A * | 2/2000 | Lien | 374/178 |
| 6,023,185 | A * | 2/2000 | Galipeau et al. | 327/513 |
| 6,149,299 | A * | 11/2000 | Aslan et al. | 374/178 |
| 6,255,891 | B1 * | 7/2001 | Matsuno et al. | 327/512 |
| 6,496,056 | B1 * | 12/2002 | Shoji | 327/543 |
| 6,531,911 | B1 * | 3/2003 | Hsu et al. | 327/512 |
| 6,737,909 | B1 * | 5/2004 | Jaussi et al. | 327/541 |
| 6,789,939 | B1 * | 9/2004 | Schrodinger et al. | 374/178 |
| 6,870,357 | B1 * | 3/2005 | Falik | 324/71.5 |
| 6,876,250 | B1 * | 4/2005 | Hsu et al. | 327/539 |
| 6,930,538 | B1 * | 8/2005 | Chatal | 327/539 |
| 6,957,910 | B1 * | 10/2005 | Wan et al. | 374/183 |
| 2003/0086476 | A1 * | 5/2003 | Mizuta | 374/178 |
| 2005/0220171 | A1 * | 10/2005 | Faour et al. | 374/178 |
| 2005/0231283 | A1 * | 10/2005 | Perry | 330/254 |

* cited by examiner

*Primary Examiner*—Gail Verbitsky
(74) *Attorney, Agent, or Firm*—Joan Pennington

(57) ABSTRACT

A method and a reference circuit for bias current switching are provided for implementing an integrated temperature sensor. A first bias current is generated and constantly applied to a thermal sensing diode. A second bias current is provided to the thermal sensing diode by selectively switching a multiplied current from a current multiplier to the thermal sensing diode or to a load diode. The reference circuit includes a reference current source coupled to current mirror. The current mirror provides a first bias current to a thermal sensing diode. The current mirror is coupled to a current multiplier that provides a multiplied current. A second bias current to the thermal sensing diode includes the first bias current and the multiplied current from the current multiplier. The second bias current to the thermal sensing diode is provided by selectively switching the multiplied current between the thermal sensing diode and a dummy load diode.

7 Claims, 2 Drawing Sheets

METHOD AND REFERENCE CIRCUIT FOR BIAS CURRENT SWITCHING FOR IMPLEMENTING AN INTEGRATED TEMPERATURE SENSOR

FIELD OF THE INVENTION

The present invention relates generally to an on-chip temperature sensing, and more particularly, relates to a method and a reference circuit for bias current switching for implementing an integrated temperature sensor.

DESCRIPTION OF THE RELATED ART

Various arrangements are known for implementing temperature sensing using a temperature sensor to generate a signal that indicates chip temperature. Temperature sensors often are implemented by a discrete module formed by a precision analog bipolar or bipolar complementary-metal-oxide-semiconductor (BICMOS) circuit design. Such separate temperature sensor modules add appreciably to the cost of typical consumer electronic products that use microprocessor or other logic that require a temperature monitoring function.

A need exists for an integrated temperature sensor that is effective and reliable, and that is generally cost effective.

SUMMARY OF THE INVENTION

Principal aspects of the present invention are to provide a method and a reference circuit for bias current switching for implementing an integrated temperature sensor. Other important aspects of the present invention are to provide such method and reference circuit for bias current switching for implementing an integrated temperature sensor substantially without negative effect and that overcome many of the disadvantages of prior art arrangements.

In brief, a method and a reference circuit for bias current switching are provided for implementing an integrated temperature sensor. The integrated temperature sensor includes a thermal sensing diode. A first bias current is generated and constantly applied to the thermal sensing diode. A second bias current to the thermal sensing diode includes the first bias current and a multiplied current from a current multiplier. The second bias current is provided to the thermal sensing diode by selectively switching the multiplied current to the thermal sensing diode or to a dummy load diode.

The reference circuit includes a reference current source coupled to current mirror. The current mirror provides a first bias current to the thermal sensing diode. The current mirror is coupled to a current multiplier that provides a multiplied current. A second bias current to the thermal sensing diode includes the first bias current and the multiplied current from the current multiplier. The second bias current to the thermal sensing diode is provided by selectively switching the multiplied current between the thermal sensing diode and the dummy load diode.

In accordance with feature of the invention, the reference circuit is formed on chip with an integrated circuit receiving an output signal of the integrated temperature sensor. The reference circuit is formed, for example, by a silicon-on-insulator (SOI) complementary metal oxide semiconductor (CMOS) circuit. The reference circuit includes a plurality of field effect transistors (FETs), such as P-channel FETs. By switching the multiplied current of the current multiplier between the thermal sensing diode and the dummy load diode, error in the temperature calculation is minimized. Gate leakage current remains substantially constant with either the first bias current or the second bias current applied to thermal sensing diode.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
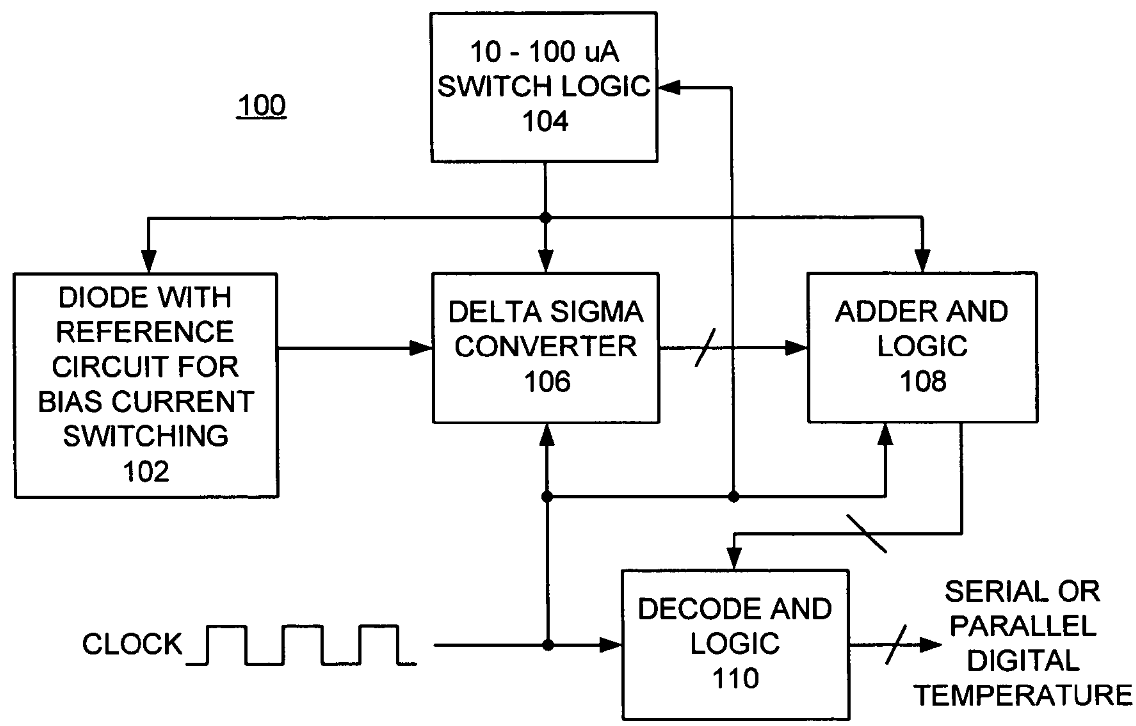
FIG. 1 is a block diagram representation of an integrated temperature sensor in accordance with the preferred embodiment.

Having reference now to the drawings, in FIG. 1, there is shown an integrated temperature sensor generally designated by the reference character 100 in accordance with the preferred embodiment. The integrated temperature sensor 100 includes a diode with a reference circuit for bias current switching block 102 of the preferred embodiment. The diode at block 102 is a thermal sensing diode used to measure temperature. An exemplary reference circuit of the preferred embodiment for the integrated temperature sensor 100 is illustrated and described with respect to FIG. 2. A switch logic block 104 provides a control signal to the diode with a reference circuit for bias current switching block 102 to switch between a first diode bias current and a second diode bias current, such as between 10 μA and 100 μA. A delta sigma converter 106 coupled to a thermal sensing diode at block 102 calculates a voltage difference of the diode at the first and second diode bias currents. The diode voltage difference varies with temperature and temperature is calculated as represented by:

$$V2-V1=n(kT/q)(In(I2/I1)), \text{ where} \quad \text{Equation 1}$$

I1 is a first diode bias current;

I2 is a second (larger) diode bias current;

V1 is the diode voltage with I1 applied to the diode;

V2 is the diode voltage with I2 applied to the diode;

n is an ideality factor of the diode (nominally 1, but varies with processing);

k is Boltzman's constant ($1.38\times10^{-23}$ joules/K;

q is the electronic charge constant ($1.60\times10^{-19}$ C); and

T is temperature in degree K.

If I2/I1=10, then equation 1 can be simplified to:

$$V2-V1=1.986\times10^{-4}*nT$$

As shown in FIG. 1, integrated temperature sensor 100 includes an adder and logic block 108 that adds digital representations of the voltage difference from the first and second diode bias current delta sigma calculations. The binary value is then either converted to serial data or loaded into a register and may also have a calibration value added by a decode and logic block 110.

In accordance with features of the preferred embodiment, a method of switching first and second diode bias currents is provided to minimize error in the temperature calculation. In the method of the invention, a first bias current is generated and constantly applied to the thermal sensing diode. A second bias current is provided to the thermal sensing diode by selectively switching a multiplied current from a current multiplier to the thermal sensing diode or to a load diode. The second bias current includes the first bias current and the multiplied current from the current multiplier.

Figure 2:
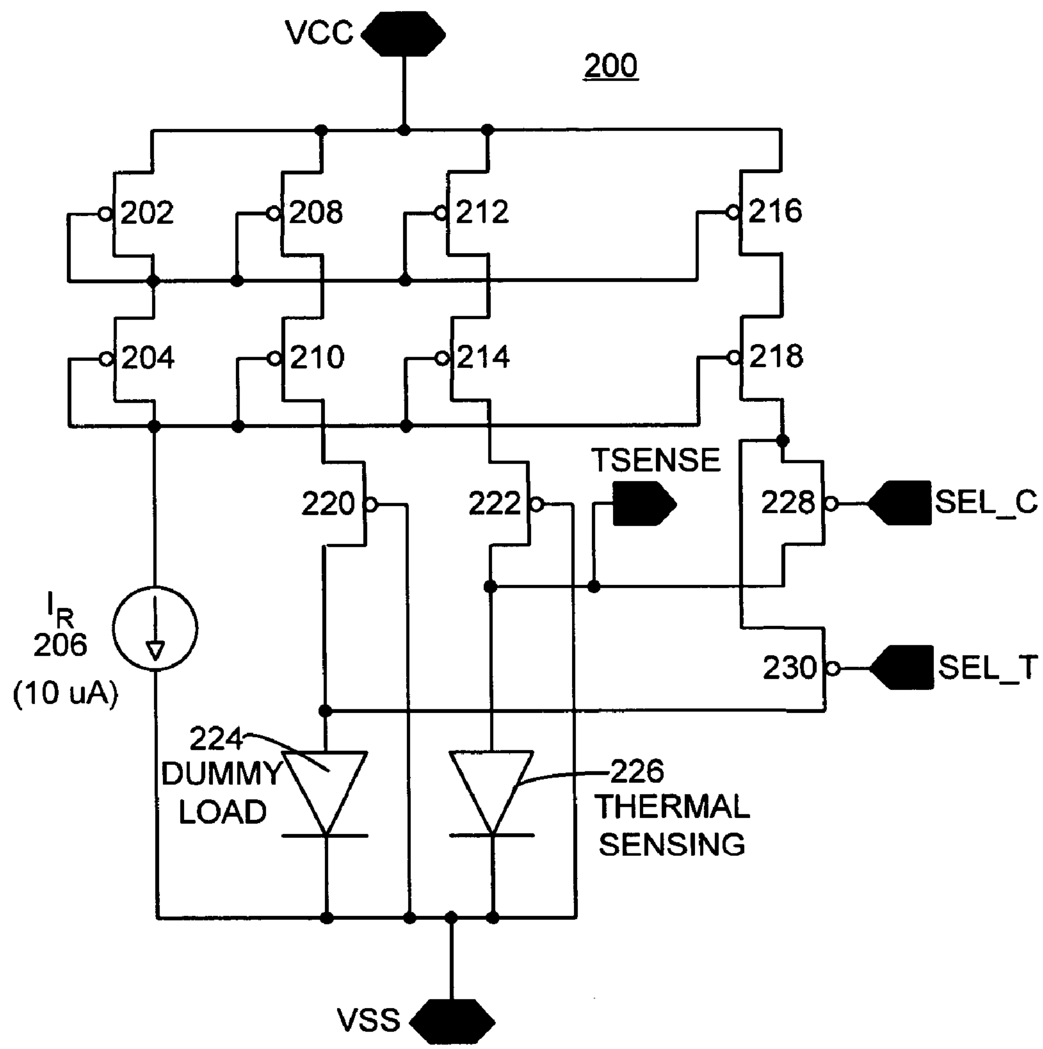
FIG. 2 is a schematic diagram representation of an exemplary reference circuit for the integrated temperature sensor of FIG. 1 in accordance with the preferred embodiment.

Referring now to FIG. 2, there is shown an exemplary reference circuit for the integrated temperature sensor 100 in accordance with the preferred embodiment and generally designated by the reference character 200. Reference circuit 200 is formed on chip with an integrated circuit or system receiving an output signal of the integrated temperature sensor 100. Reference circuit 200 is formed by a plurality of field effect transistors (FETs), such as a plurality of P-channel FETs, as shown.

Reference circuit 200 includes a pair of series connected reference current source PFETs 202, 204. A source of PFET 202 is connected to a high voltage supply rail VCC. A drain of PFET 202 is connected to the source of PFET 204 with a drain current indicated as a reference current $I_R$ 206, such as a 10 μA current to a ground voltage supply rail VSS. The reference current is mirrored in two current mirror stages defined by a first pair of series connected PFETs 208, 210, and a second pair of series connected PFETs 212, 214. The reference current is multiplied in a current multiplier defined by a pair of series connected PFETs 216, 218.

Current source PFET 202 has its gate and its drain connected to the gate of PFETs 208, 212, 216. Current source PFET 204 has its gate and its drain connected to the gate of PFETs 210, 214, 218. A source of current mirror PFET 208 is connected to the high voltage supply rail VCC. A drain of current mirror PFET 208 is connected to the source of current mirror PFET 210. A source of current mirror PFET 212 is connected to the high voltage supply rail VCC. A drain of current mirror PFET 212 is connected to the source of current mirror PFET 214. A source of current multiplier PFET 216 is connected to the high voltage supply rail VCC. A drain of current multiplier PFET 216 is connected to the source of current multiplier PFET 218.

The current mirror PFET 212 has a total width matching the width of the current source PFET 202 and current mirror PFET 208. The current mirror PFET 212 and the current multiplier PFET 216 are, for example, interdigitated allowing for precision matching of PFETs 212, 216 to insure the ratio of currents is statistically accurate. The current mirror PFET 212 and the current multiplier PFET 216 have respective finger vectoring of <1:20> and <1:180>. For example, the current multiplier PFETs 216, 218 multiply the reference current by 9 to provide multiplied current of 90 μA.

The first pair of series connected current mirror PFETs 208, 210 is connected between the high voltage supply rail VCC and a source of a PFET 220. The second pair of series connected current mirror PFETs 212, 214 is connected between the high voltage supply rail VCC and a source of a PFET 222. The drain of PFET 220 is connected to an anode of a dummy load diode 224 having a cathode connected to the ground voltage supply rail VSS. The drain of PFET 222 is connected to an anode of a thermal sensing diode 226 having a cathode connected to the ground voltage supply rail VSS. The gate of PFETs 220, 222 is connected to the ground voltage supply rail VSS.

A pair of PFETs 228, 230 is provided for selectively switching the multiplied current between the thermal sensing diode 226 and the dummy load diode 224. The PFETs 228, 230 are the same size. A source of each of the PFETs 228, 230 is connected to a drain of the current multiplier PFET 218.

A respective gate control input SEL_C, SEL_T is applied to a gate of the respective PFETs 228, 230. The PFET 228 is used to switch the multiplied current to the thermal sensing diode 226. The PFET 230 is used to switch the multiplied current to the dummy load diode 224. The PFETs 220, 222 are the same size as PFET 228 to match the voltage drop across PFET 228.

In accordance with features of the preferred embodiment, by switching the multiplied current between the thermal sensing diode 226 and the dummy load diode 224, error in the temperature calculation is minimized. Gate leakage current remains substantially constant with either the first bias current or the second bias current applied to thermal sensing diode 226. The plurality of PFETs forming the reference circuit 200 can be implemented by various technologies, including a silicon-on-insulator (SOI) complementary metal oxide semiconductor (CMOS) circuit and a bulk CMOS circuit.

While the present invention has been described with reference to the details of the embodiments of the invention shown in the drawing, these details are not intended to limit the scope of the invention as claimed in the appended claims.

What is claimed is:

1. A reference circuit for implementing an integrated temperature sensor comprising:

a reference current source coupled to a current mirror; said current mirror providing a first bias current to a thermal sensing diode; said current mirror including two current mirror stages; a first current mirror stage coupled to said thermal sensing diode and a second current mirror stage coupled to said dummy load diode; said two current mirror stages being defined by a first pair of series connected P-channel field effect transistors (FETs), and a second pair of series connected P-channel FETs;

a current multiplier coupled to said current mirror providing a multiplied current; said current multiplier including a pair of series connected P-channel field effect transistors (PFETs);

a pair of transistors coupled to said current multiplier, said respective transistors selectively switching the multiplied current between said thermal sensing diode and a dummy load diode to provide a second bias current to the thermal sensing diode; said second bias current including the first bias current and the multiplied current from the current multiplier.

2. A reference circuit for implementing an integrated temperature sensor as recited in claim 1 includes a first PFET coupled between said first current mirror stage and an anode of said thermal sensing diode and a second PFET coupled between said second current mirror stage and an anode of said dummy load diode.

3. A reference circuit for implementing an integrated temperature sensor as recited in claim 2 wherein said first PFET coupled to said first current mirror stage and said second PFET coupled to said second current mirror stage and said pair of transistors coupled to said current multiplier are substantially matching size transistors.

4. A reference circuit for implementing an integrated temperature sensor as recited in claim 1 wherein said second bias current has a predetermined magnitude on the order of ten times as large as said first bias current.

5. A reference circuit for implementing an integrated temperature sensor as recited in claim 1 wherein said second diode bias current is about 100 μA and said first bias current is about 10 μA.

6. A reference circuit for implementing an integrated temperature sensor as recited in claim 1 is defined by silicon-on-insulator (SOI) complementary metal oxide semiconductor (CMOS) devices.

7. A reference circuit for implementing an integrated temperature sensor as recited in claim 1 is defined by bulk complementary metal oxide semiconductor (CMOS) devices.

* * * * *